United States Patent
Lin et al.

(10) Patent No.: US 8,723,788 B2
(45) Date of Patent: May 13, 2014

(54) REAL-TIME INFORMATION TRANSMISSION AND RECEPTION SYSTEM

(75) Inventors: Min-Chuan Lin, Tainan (TW); Guo-Ruey Tsai, Tainan (TW)

(73) Assignee: Kun Shan University of Technology, Tainan (TW)

( * ) Notice: Subject to any disclaimer, the term of this patent is extended or adjusted under 35 U.S.C. 154(b) by 92 days.

(21) Appl. No.: 13/341,519

(22) Filed: Dec. 30, 2011

(65) Prior Publication Data

US 2012/0169605 A1 Jul. 5, 2012

(30) Foreign Application Priority Data

Jan. 3, 2011 (TW) ............................. 100200049 U (51) Int. Cl.
*G09G 5/00* (2006.01)
(52) U.S. Cl.
USPC .......................................... 345/156; 398/172
(58) Field of Classification Search
None
See application file for complete search history.

(56) References Cited

U.S. PATENT DOCUMENTS

| | | | |
|---|---|---|---|
| 4,807,031 A * | 2/1989 | Broughton et al. | 348/460 |
| 5,204,768 A * | 4/1993 | Tsakiris et al. | 398/107 |
| 6,850,782 B2 * | 2/2005 | Bright et al. | 455/567 |
| 2008/0138085 A1 * | 6/2008 | Lin et al. | 398/172 |
| 2010/0054748 A1 * | 3/2010 | Sato | 398/130 |
| 2010/0322635 A1 * | 12/2010 | Klinghult | 398/132 |
| 2011/0135317 A1 * | 6/2011 | Chaplin | 398/172 |

* cited by examiner

*Primary Examiner* — Jason Olson
(74) *Attorney, Agent, or Firm* — Birch, Stewart, Kolasch & Birch, LLP (57) ABSTRACT

In a real-time information transmission and reception system, a transmission device includes a light emitter driven by a modulated control signal generated by a modulation controller based on a code sequence, which is encoded from an input signal generated by an input unit and corresponding to information to be transmitted, to emit light. The modulated control signal has a constant average power, and various frequencies greater than 60 Hz. A reception device includes a photoelectric sensor for sensing the light emitted by the light emitter to generate a current signal that is demodulated and processed to generate a data output corresponding to the information and received by a display unit for displaying the information thereon.

4 Claims, 6 Drawing Sheets

FIG. 1

| Morse Code | Frequency component |
|---|---|
| Dot | $1^{st}$ frequency |
| Dash | $2^{nd}$ frequency |
| intra-character gap | $3^{rd}$ frequency |
| short gap | $4^{th}$ frequency (not shown in FIG. 2(B)) |
| Medium gap | $5^{th}$ frequency (not shown in FIG. 2(B)) |

| From PS/2 keyboard | Frequency component |
|---|---|
| Logic-high bit | ⎍ |
| Logic-low bit | ⎍ |
| Spacer | not shown in FIG. 4(B) |

FIG. 4(A)

REAL-TIME INFORMATION TRANSMISSION AND RECEPTION SYSTEM

CROSS-REFERENCE TO RELATED APPLICATION

This application claims priority to Taiwanese Application No. 100200049, filed on Jan. 3, 2011.

BACKGROUND OF THE INVENTION

1. Field of the Invention

The invention relates to information transmission and reception, and more particularly to a real-time information transmission and reception system.

2. Description of the Related Art

In many international conferences, interpretation services for a common language, such as English, are usually provided for some listeners by earphones worn thereon. Any listener may feel uncomfortable and inconvenient for a long time to wear a headphone. In addition, during a meeting, announcements for important related information are usually broadcasted among the meeting room, thereby interrupting the proceeding of the meeting.

Therefore, visual information can substitute for the interpretation content received by the headphones or the announced information broadcasted among the meeting room.

SUMMARY OF THE INVENTION

Therefore, an object of the present invention is to provide real-time information transmission and reception system that can overcome the aforesaid drawbacks of the prior art.

According to the present invention, a real-time information transmission and reception system comprises:
a transmission device including
an input unit operable to generate an input signal corresponding to information to be transmitted, the information consisting of a plurality of characters,
an encoder connected electrically to the input unit for receiving the input signal therefrom, and encoding the input signal into a code sequence using a coding method,
a modulation controller connected electrically to the encoder, and receiving the code sequence from the encoder so as to generate a modulated control signal corresponding to the code sequence, the modulated control signal having a constant average power, and various frequencies greater than 60 Hz, and
a light emitter connected electrically to the modulating controller and driven by the modulated control signal from the modulation controller to emit light with intensity variations associated with the code sequence; and
at least one reception device including
a display unit,
a photoelectric sensor for sensing variation in the intensity of the light emitted by the light emitter of the transmission device so as to generate a current signal,
a demodulator connected electrically to the photoelectric sensor, and demodulating the current signal from the photoelectric sensor to generate a demodulated output, and
a signal processing unit connected electrically to the demodulator and the display unit, and operable to generate a data output corresponding to the information based on the demodulated output from the demodulator using a look-up table established by the coding method, the signal processing unit outputting the data output to the display unit such that the information is displayed on the display unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
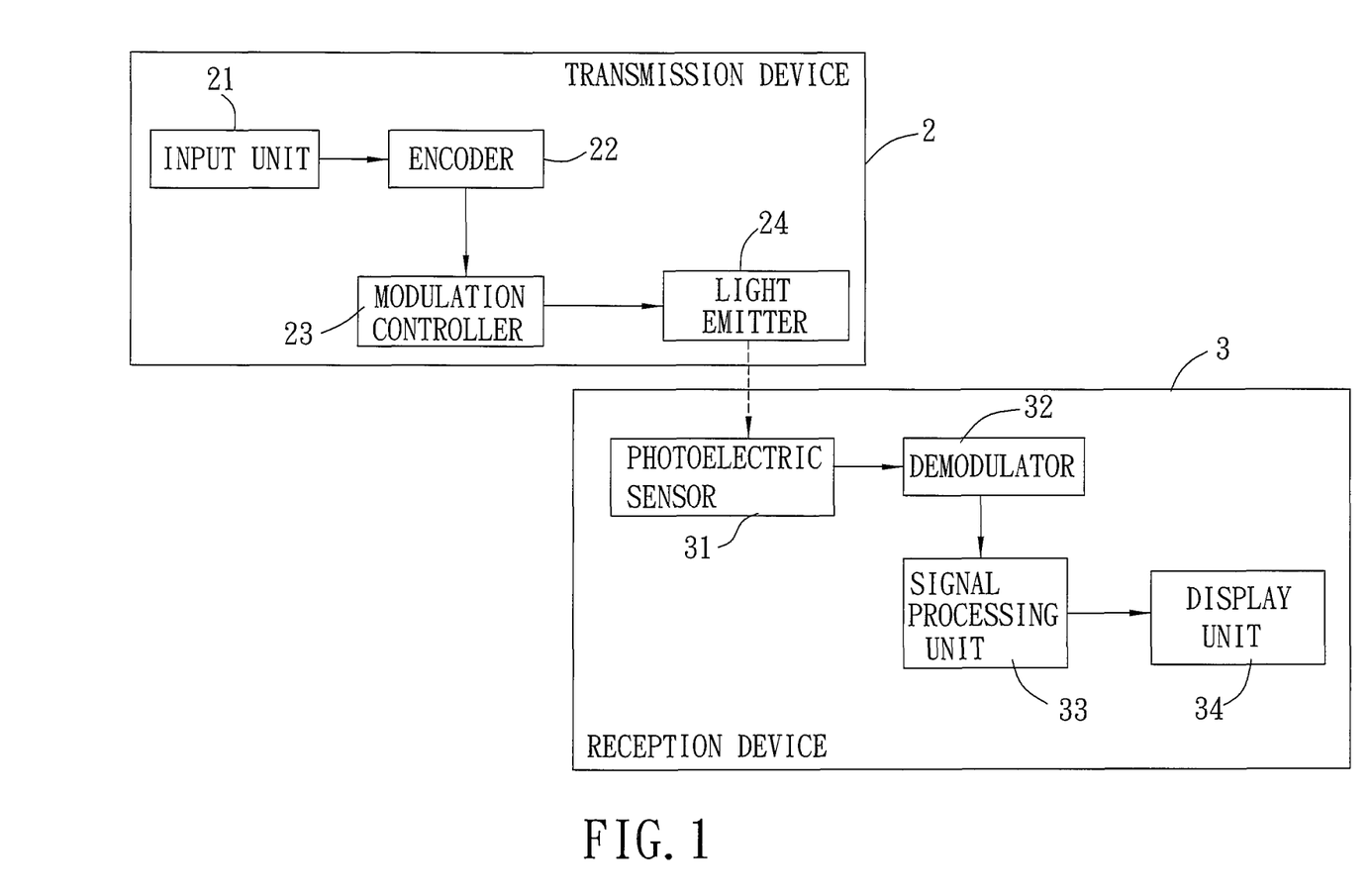
FIG. 1 is a schematic circuit block diagram illustrating the preferred embodiment of a real-time information transmission and reception system according to the present invention.

Referring to FIG. 1, the preferred embodiment of a real-time information transmission and reception system 10 according to the present invention is shown to include a transmission device 2 and at least one reception device 3. In this embodiment, only one reception device 3 is shown, but it is not limited thereto.

The transmission device 2 includes an input unit 21, an encoder 22, a modulation controller 23, and a light emitter 24.

The input unit 21 is operable to generate an input signal corresponding to information to be transmitted. The information consists of a plurality of characters. In this embodiment, the input unit 21 is a keyboard device. In other embodiments, the input unit 21 can be a voice recognition device.

The encoder 22 is connected electrically to the input unit 21 for receiving the input signal therefrom, and encodes the input signal into a code sequence using a known coding method. In this embodiment, the code sequence is in the form of Morse codes.

Figure 2A:
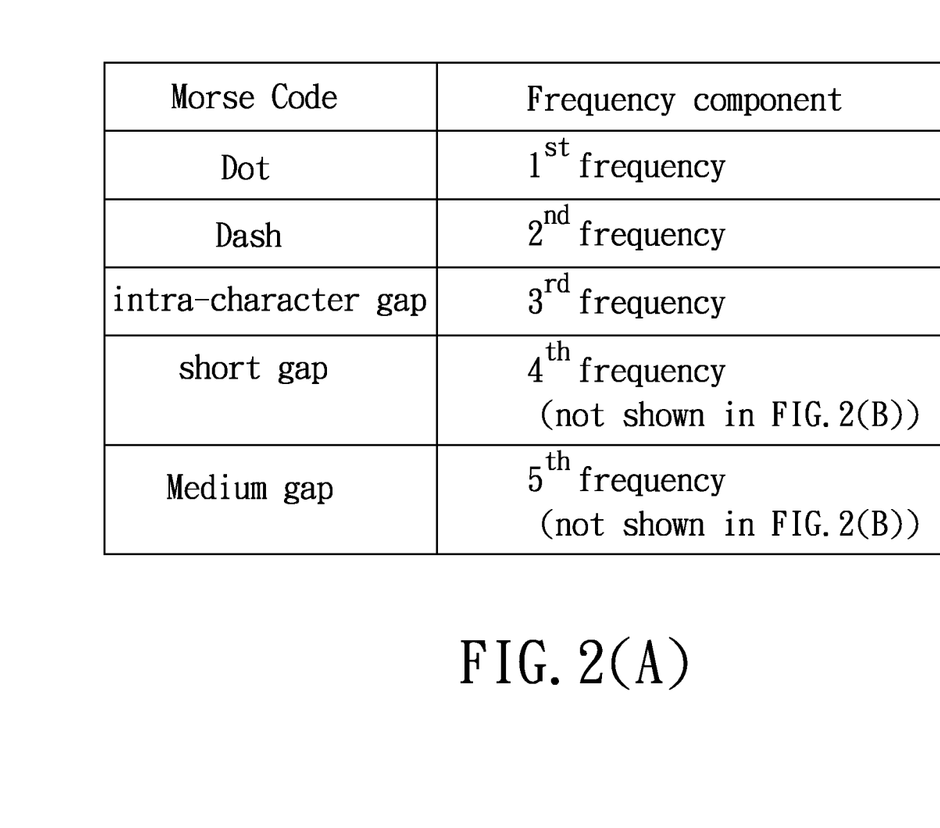
FIG. 2(A) is a table showing an example of relationships among elements of Morse code and frequency components of a modulated control signal generated by a modulation controller of the preferred embodiment when a code sequence received by the modulation controller is in the form of Morse code.
Figure 2B:
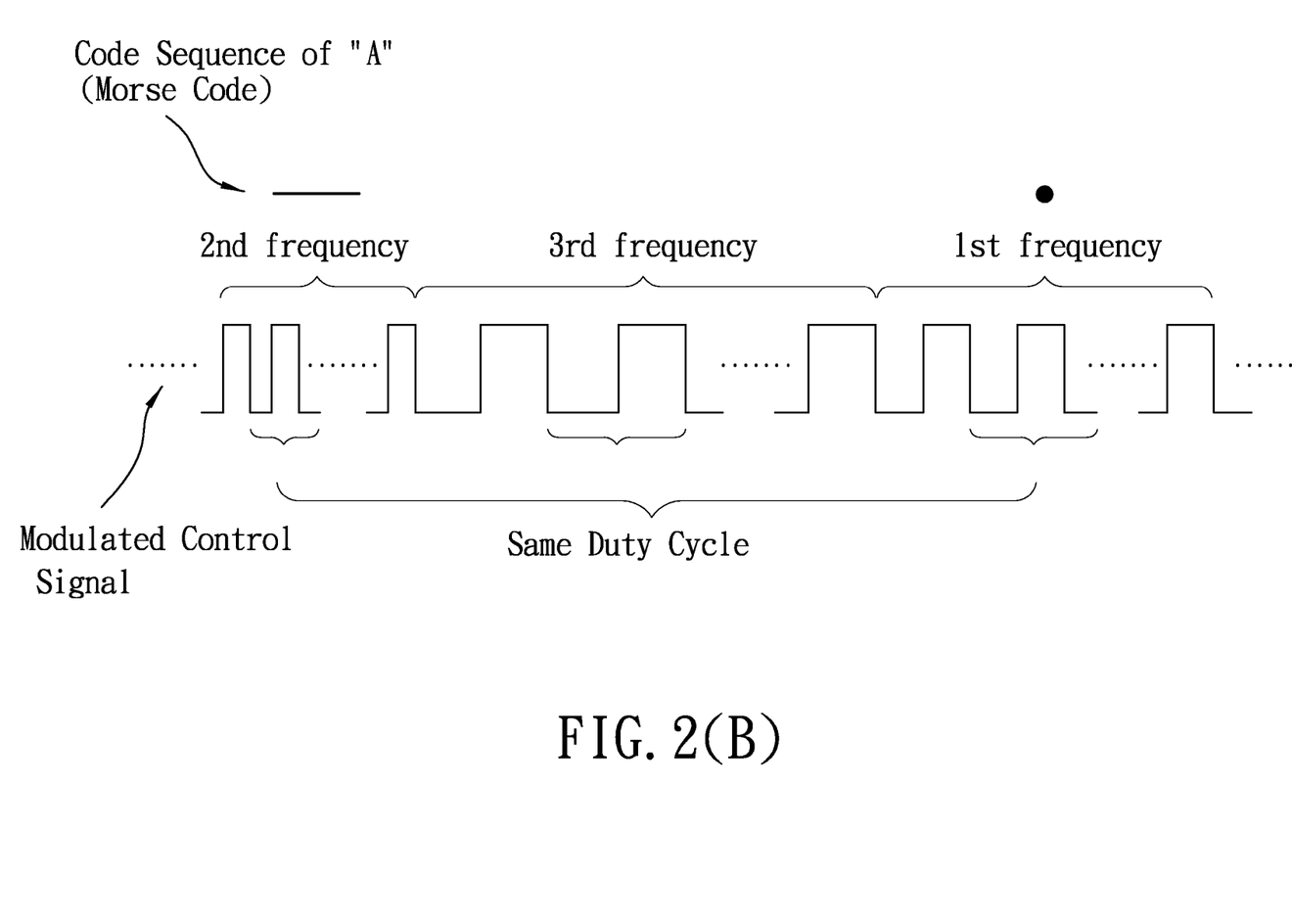
FIG. 2(B) is an exemplary waveform of the modulated control signal according to the relationships shown in FIG. 2(A)

The modulation controller 23 is connected electrically to the encoder 22, and receives the code sequence from the encoder 22 so as to generate a modulated control signal corresponding to the code sequence. The modulated control signal has a constant average power, and various frequencies greater than 60 Hz. It is noted that the modulated control signal is a composite voltage signal having plural frequency components with different frequencies and the same duty cycle. In addition, the modulated control signal is one of a pulse width modulation signal and a delta-sigma modulation signal. In this embodiment, the frequency components of the modulated control signal have five different frequencies corresponding respectively to five type codes in Morse code (see FIGS. 2(A) and 2(B) for a non-limiting example).

The light emitter 24 is connected electrically to the modulation controller 23 and is driven by the modulated control signal from the modulation controller 23 to emit light with intensity variations associated with the code sequence. It is noted that the light emitter 24 can be implemented as a lamp device consisting of plural light emitting diodes. Since the frequencies of the modulated control signal are greater than 60 Hz, human eyes cannot sense flashes caused by intensity variations of the light emitted from the lamp device. In addition, since the frequency components of the modulated control signal have the same duty cycle and the same average power, the lamp device can emit light at a constant average power, thereby providing stable illumination.

The reception device 3 includes a photoelectric sensor 31, a demodulator 32, a signal processing unit 33, and a display unit 34.

The photoelectric sensor 31 senses variation in the intensity of the light emitted by the light emitter 24 of the transmission device 2 so as to generate a current signal.

The demodulator 32 is connected electrically to the photoelectric sensor 31, and demodulates the current signal from the photoelectric sensor 31 to generate a demodulated output. In this embodiment, the demodulated output is a frequency output consisting of the five frequencies corresponding respectively to the five type codes in the Morse code. Since the feature of this invention does not reside in the configuration of the demodulator, which is known to those skilled in the art, details of the same are omitted herein for the sake of brevity.

The signal processing unit 33 is connected electrically to the demodulator 32 and the display unit 24. The signal processing unit 33 is operable to generate a data output corresponding to the information based on the demodulated output from the demodulator 32 using a loop-up table established by the coding method. Subsequently, the signal processing unit 33 outputs the data output to the display unit 34 such that the information is displayed on the display unit 34.

Furthermore, in other embodiments, the code sequence generated by the encoder 22 of the transmission device 2 can be in the form of ASCII (American Standard Code for Information Interchange) codes. In this case, the code sequence includes a plurality of code segments with the same code length, for example, 16-bit length. Each code segment corresponds to a respective character of the information, and includes the same number of logic-high bits (i.e., "1"), for example, 8 logic-high bits, and the same number of logic-low bits (i.e., "0"), for example, 8 logic-low bits. More specifically, the encoder 22 processes the input signal from the input unit 21 to generate, for each character of the information, a 8-bit ASCII code serving as a first code portion, and a 8-bit code logically inverted from the first code portion, serving as a second code portion and following the first code portion such that the first and second code portions constitute a corresponding code segment. For example, the code segment corresponding to a character of a letter "A" can be represented as "0100000110111110", wherein the first code portion represented as "01000001" is a 8-bit ASCII code associated with the letter "A", and the second code portion represented as "10111110" is logically inverted from the first code portion (see FIG. 3 for a non-limiting example).

Figure 3:
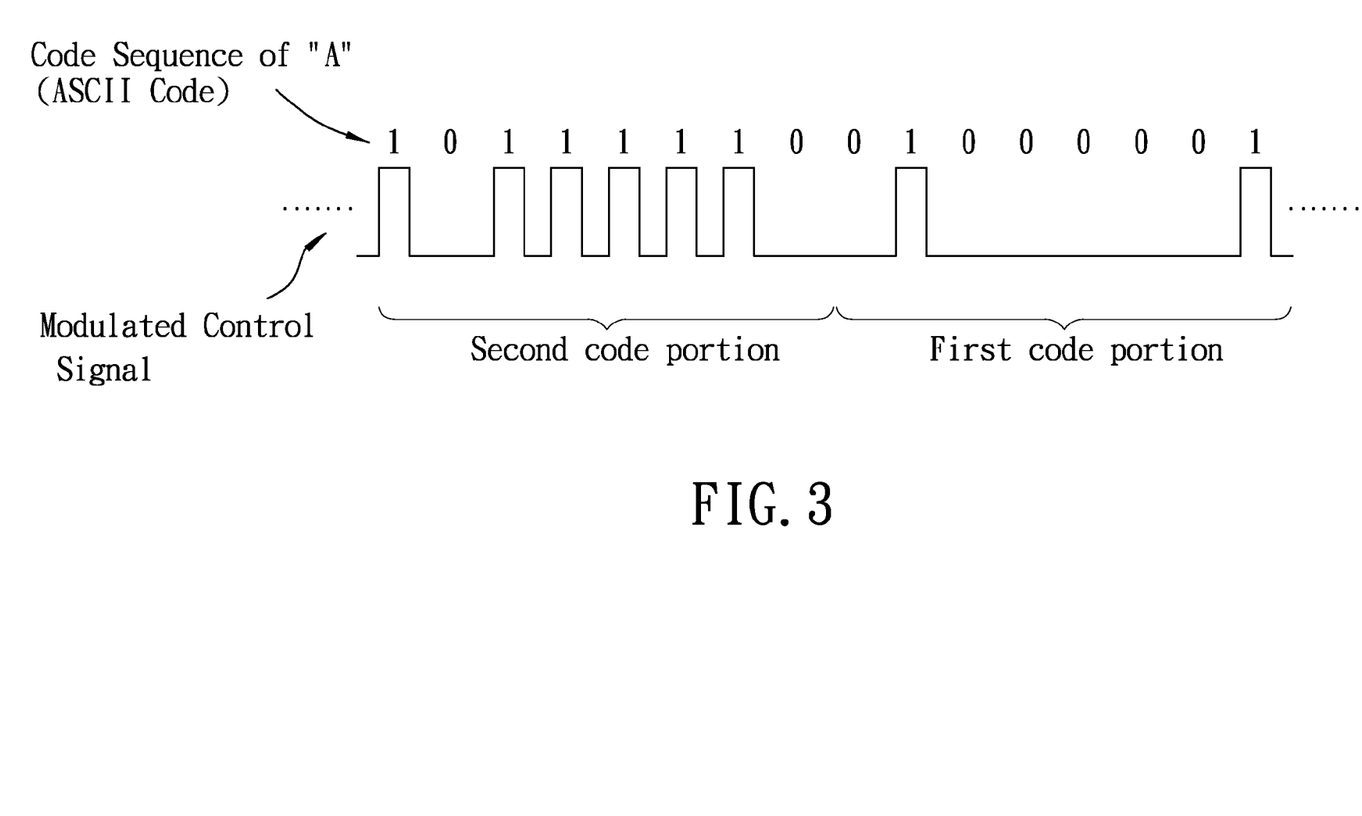
FIG. 3 is an exemplary waveform of the modulated control signal generated by the modulation controller in another embodiment when the code sequence received by the modulation controller is in the form of ASCII code.

Accordingly, the modulated control signal generated by the modulation controller 23 of the transmission device 2 includes a plurality of pulse components corresponding respectively to the logic-high bits of the code sequence and having the same duty cycle, and a plurality of non-pulse components corresponding respectively to the logic-low bits of the code sequence. The pulse and non-pulse components have the same cycle period less than 1 ms. Since each of the code segments of the code sequence has 8 logic-high bits, the modulated control signal has 8 pulse components per time unit of 16 cycle periods. Thus, the light emitter 24 is driven by the modulated control signal to emit at an average power.

In addition, the signal processing unit 33 of the reception device 3 deletes a portion of the demodulated output corresponding to the second code portions of the code segments of the code sequence, and decodes a remaining portion of the demodulated output corresponding to the first code portions of the code segments of the code sequence based on the look-up table in accordance with ASCII code to obtain the output data.

Figure 4A:
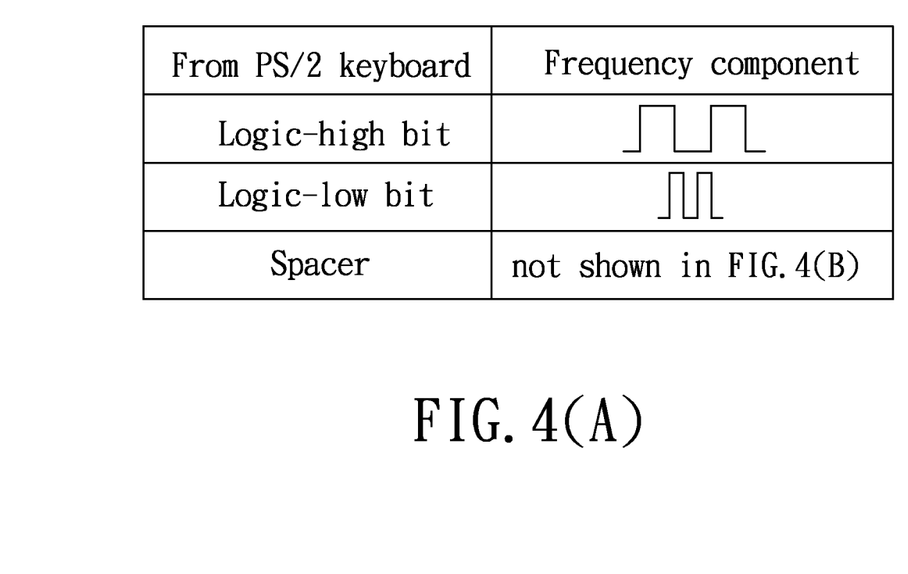
FIG. 4(A) is a table showing an example of relationships among logic bits and frequency components of a modulated control signal generated by the modulation controller in yet another embodiment when the modulation controller receives the code sequence from a PS/2 keyboard.
Figure 4B:
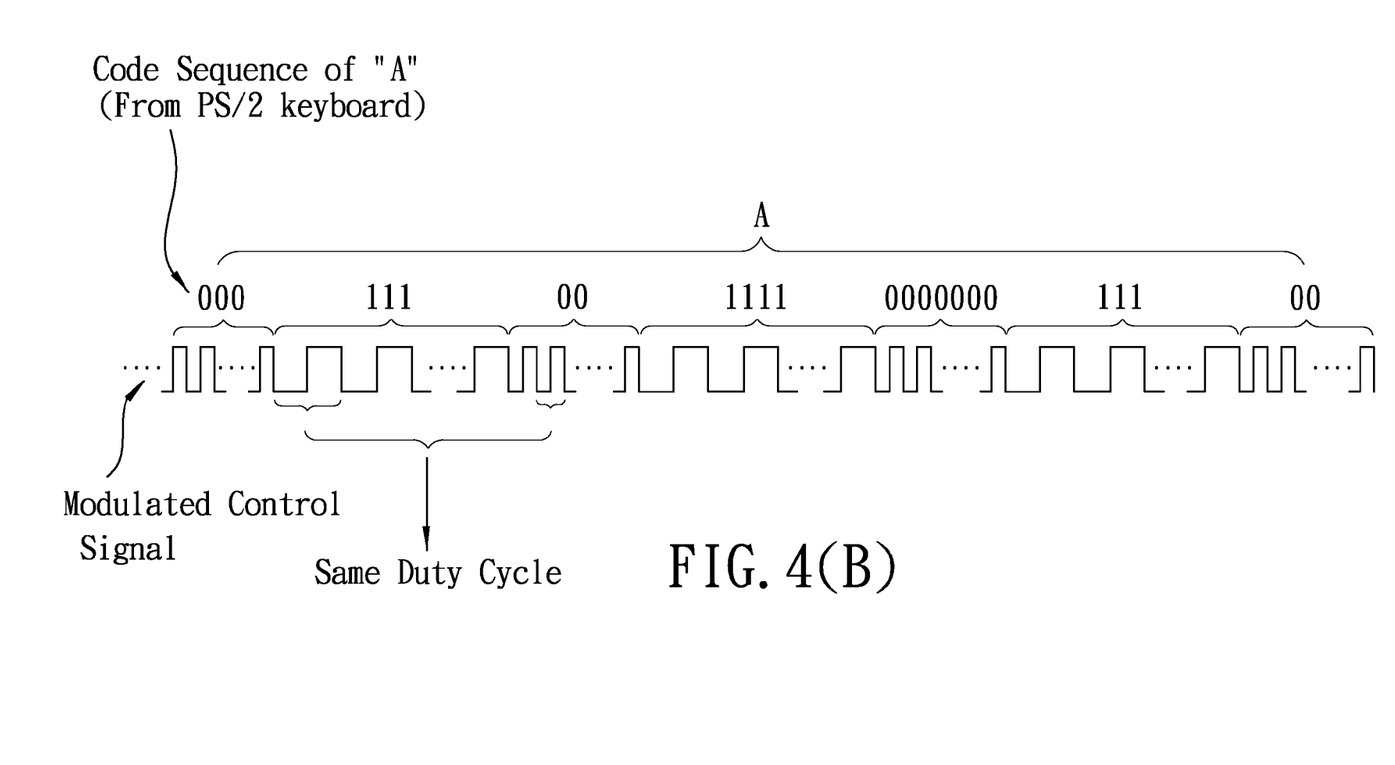
FIG. 4(B) is an exemplary waveform of the modulated control signal according to the relationships shown in FIG. 4(A).

On the other hand, the input unit 21 and the encoder 22 of the transmission device 2 are integrated into a PS/2 keyboard (not shown). In this case, the code sequence generated by the encoder 22 includes a plurality of 24-bit code segments corresponding respectively to the characters of the information. Each code segment includes a plurality of logic-high bits, i.e., "1", and a plurality of logic-low bits, i.e., "0". For example, when a character "A" is input via the input unit 21, a 24-bit code segment represented as "000111001111000000011100" is generated by the encoder 22. Accordingly, the frequency components of the modulated control signal generated by the modulation controller 23 have three different frequencies, i.e., first, second and third frequencies, and the same duty cycle, wherein the frequency components with the first frequency correspond respectively to the logic-low bits of the code sequence, the frequency components with the second frequency correspond respectively to the logic-high bits of the code sequence, and the frequency components with the third frequency correspond respectively to spacers each interposed between two adjacent ones of the code segments of the code sequence (see FIGS. 4(A) and 4(B) for a non-limiting example).

In sum, when the real-time information transmission and reception system of the present invention is combined with an illumination equipment arranged in a meeting room, visual information displayed on the display unit 34 can be easily produced without influence on illumination in the meeting room.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A real-time information transmission and reception system comprising:
   a transmission device including
      an input unit operable to generate an input signal corresponding to information to be transmitted, the information consisting of a plurality of characters,
      an encoder connected electrically to said input unit for receiving the input signal therefrom, and encoding the input signal into a code sequence using a coding method,
      a modulation controller connected electrically to said encoder, and receiving the code sequence from said encoder so as to generate a modulated control signal corresponding to the code sequence, the modulated control signal having a constant average power, and various frequencies greater than 60 Hz, and a light emitter connected electrically to said modulating controller and driven by the modulated control signal from said modulation controller to emit light with intensity variations associated with the code sequence; and at least one reception device including a display unit, a photoelectric sensor for sensing variation in the intensity of the light emitted by said light emitter of said transmission device so as to generate a current signal, a demodulator connected electrically to said photoelectric sensor, and demodulating the current signal from said photoelectric sensor to generate a demodulated output, and a signal processing unit connected electrically to said demodulator and said display unit, and operable to generate a data output corresponding to the information based on the demodulated output from said demodulator using a look-up table established by the coding method, said signal processing unit outputting the data output to said display unit such that the information is displayed on said display unit;

wherein the modulated control signal generated by said modulation controller of said transmission device is a composite voltage signal having plural frequency components with different frequencies and the same duty cycle, and wherein:

the code sequence generated by said encoder of said transmission device is in the form of Morse codes;

the frequency components of the modulated control signal generated by said modulation controller of said transmission device have five different frequencies.

2. A real-time information transmission and reception system comprising:

a transmission device including an input unit operable to generate an input signal corresponding to information to be transmitted, the information consisting of a plurality of characters, an encoder connected electrically to said input unit for receiving the input signal therefrom, and encoding the input signal into a code sequence using a coding method, a modulation controller connected electrically to said encoder, and receiving the code sequence from said encoder so as to generate a modulated control signal corresponding to the code sequence, the modulated control signal having a constant average power, and various frequencies greater than 60 Hz, and a light emitter connected electrically to said modulating controller and driven by the modulated control signal from said modulation controller to emit light with intensity variations associated with the code sequence; and at least one reception device including a display unit, a photoelectric sensor for sensing variation in the intensity of the light emitted by said light emitter of said transmission device so as to generate a current signal, a demodulator connected electrically to said photoelectric sensor, and demodulating the current signal from said photoelectric sensor to generate a demodulated output, and a signal processing unit connected electrically to said demodulator and said display unit, and operable to generate a data output corresponding to the information based on the demodulated output from said demodulator using a look-up table established by the coding method, said signal processing unit outputting the data output to said display unit such that the information is displayed on said display unit;

wherein the modulated control signal generated by said modulation controller of said transmission device is a composite voltage signal having plural frequency components with different frequencies and the same duty cycle, and wherein:

said input unit and said encoder of said transmission device are integrated into a PS/2 keyboard such that the code sequence includes a plurality of 24-bit code segments corresponding respectively to the characters of the information; and said frequency components of the modulated control signal generated by said modulation controller of said transmission device have three different frequencies.

3. A real-time information transmission and reception system comprising:

a transmission device including an input unit operable to generate an input signal corresponding to information to be transmitted, the information consisting of a plurality of characters, an encoder connected electrically to said input unit for receiving the input signal therefrom, and encoding the input signal into a code sequence using a coding method, a modulation controller connected electrically to said encoder, and receiving the code sequence from said encoder so as to generate a modulated control signal corresponding to the code sequence, the modulated control signal having a constant average power, and various frequencies greater than 60 Hz, and a light emitter connected electrically to said modulating controller and driven by the modulated control signal from said modulation controller to emit light with intensity variations associated with the code sequence; and at least one reception device including a display unit, a photoelectric sensor for sensing variation in the intensity of the light emitted by said light emitter of said transmission device so as to generate a current signal, a demodulator connected electrically to said photoelectric sensor, and demodulating the current signal from said photoelectric sensor to generate a demodulated output, and a signal processing unit connected electrically to said demodulator and said display unit, and operable to generate a data output corresponding to the information based on the demodulated output from said demodulator using a look-up table established by the coding method, said signal processing unit outputting the data output to said display unit such that the information is displayed on said display unit;

wherein the code sequence generated by said encoder of said transmission device is in the form of ASCII codes, and wherein:

the code sequence generated by said encoder of said transmission device includes a plurality of code segments with the same code length, each of the code segments corresponding to a respective one of the characters of the information and including the same number of logic-high bits and the same number of logic-low bits; and the modulated control signal generated by said modulation controller of said transmission device includes a plurality of pulse components corresponding respectively to the logic-high bits of the code sequence, and having the same duty cycle, and the same cycle period less than 1 ms.

4. The real-time information transmission and reception system as claimed in claim 3, wherein:

said encoder of said transmission device processes the input signal from said input unit to generate, for each of the characters of the information, a 8-bit ASCII code serving as a first code portion, and a 8-bit code logically inverted from the first code portion, serving as a second code portion and following the first code portion; and said signal processing unit of said reception device deletes a portion of the demodulated output corresponding to the second code portions of the code segments of the code sequence, and decodes a remaining portion of the demodulated output corresponding to the first code portions of the code segments of the code sequence to obtain the output data.

* * * * *